United States Patent [19]
Gocht

[11] Patent Number: 5,039,313
[45] Date of Patent: Aug. 13, 1991

[54] METHOD OF AND APPARATUS FOR THE CLEANING OF THE EXHAUST AIR OF A PAINT-SPRAY OR LACQUER-SPRAY BOOTH

[75] Inventor: Paul-Gerhard Gocht, Morfelden-Walldorf, Fed. Rep. of Germany

[73] Assignee: Metallgesellschaft Aktiengesellschaft, Frankfurt am Main, Fed. Rep. of Germany

[21] Appl. No.: 157,847

[22] Filed: Feb. 18, 1988

[30] Foreign Application Priority Data

Feb. 21, 1987 [DE] Fed. Rep. of Germany ....... 3705634

[51] Int. Cl.$^5$ ............................................. B01D 53/14
[52] U.S. Cl. ............................................. 55/8; 55/10; 55/89; 55/122; 55/228; 55/DIG. 46
[58] Field of Search .................. 55/8, 10, 118, 122, 55/228, DIG. 46, 89

[56] References Cited

U.S. PATENT DOCUMENTS

| 2,021,281 | 11/1935 | Bingman ............................. 55/228 |
| 2,245,516 | 6/1941 | Wintermute ......................... 55/118 |
| 2,486,877 | 11/1949 | Ransburg et al. ......... 55/DIG. 46 X |
| 3,035,507 | 5/1962 | Gresham ................... 55/DIG. 46 X |
| 3,421,293 | 1/1969 | Halls ................................. 55/228 X |
| 3,516,230 | 6/1970 | Saubesty ................................. 55/228 |
| 4,620,858 | 11/1986 | Bradshaw et al. ................. 55/228 X |

FOREIGN PATENT DOCUMENTS

| 82/00781 | 3/1982 | European Pat. Off. ................... 55/8 |
| 2412988 | 2/1979 | Fed. Rep. of Germany . |
| 2161198 | 4/1982 | Fed. Rep. of Germany . |
| 2814276 | 9/1982 | Fed. Rep. of Germany . |
| 3042464 | 10/1982 | Fed. Rep. of Germany . |
| 3517392 | 11/1985 | Fed. Rep. of Germany . |

Primary Examiner—Robert Spitzer
Attorney, Agent, or Firm—Herbert Dubno

[57] ABSTRACT

The exhaust air from a paint-spray or lacquer spray booth is cleaned after passing through the grate bottom thereof directly to a wet electrostatic filter. The air which is sprayed with atomized water immediately before entering the wet electrostatic filter is partly re-circulated after passing through the latter while the water containing the paint and lacquer particles is cleaned and recycled as well.

12 Claims, 1 Drawing Sheet

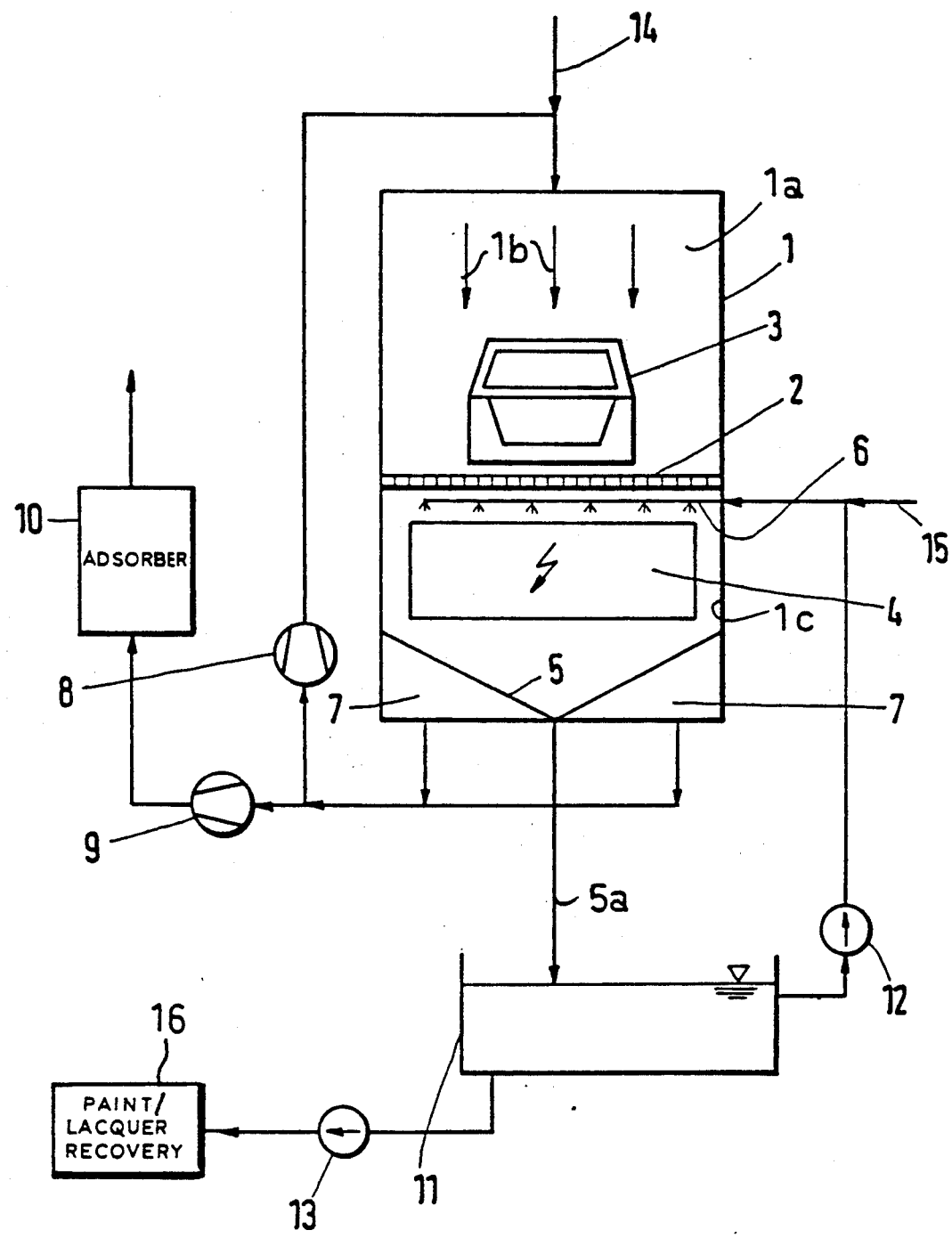

METHOD OF AND APPARATUS FOR THE CLEANING OF THE EXHAUST AIR OF A PAINT-SPRAY OR LACQUER-SPRAY BOOTH

FIELD OF THE INVENTION

My present invention relates to a method of and an apparatus for the cleaning of the exhaust air from a spray booth, especially a paint-spray or lacquer-spray booth in which the particle-laden air is washed with water recirculated after removal of particulates therefrom.

BACKGROUND OF THE INVENTION

The art shows a development in the field of cleaning the exhaust air from paint and lacquer spray booths ranging from the description in U.S. Pat. No. 3,421,293, to more sophisticated and complex arrangements as will be described below.

In the approach of U.S. Pat. No. 3,421,293, the apparatus for the removal of paint from the exhaust air of a paint-spray booth provides below the grate-like floor of the spray booth means for bringing the exhaust air passing downwardly through into intensive contact with wash water which is recirculated. After separation of the exhaust air from the water, the paint is carried off in the wash water. The wash water is treated with chemicals to improve the washing effect and to permit the wash water to be cleaned, i.e. to allow the paint particles to be removed from the wash water.

German patent document DE-AS 21 61 198, DE-AS 24 12 988 and DE-PS 28 14 276 describe respective particles which operate under the same principle without describing in each case the wash water recirculation. In each of these documents, emphasis is placed on the shape of the apparatus which is intended to ensure intimate contact between the exhaust air and the wash water. Utilizing the techniques described in these documents, improvements in air cleaning efficiency at reduced noise levels can be obtained.

European patent 0 047 432 describes an exhaust-air scrubber as the first cleaning stage for the exhaust air and provides thorough scrubbing in this first stage. It mentions that a second cleaning stage can be provided following the first and which includes a wet electrostatic filter or precipitator supplied with a rinse liquid, the cleaned air being partially recirculated to the spray booth.

German patent DE-PS 30 42 464 describes a technique based upon the principle of reducing the energy consumption of a conventional scrubber or the principle of improving the air-cleaning efficiency for a given energy consumption. This also requires a particular shape of the scrubber housing and utilizes a constriction of special form to permit intimate contact of the wash water with the exhaust air.

Finally, mention may be made of German patent document DE-OS 35 17 392 which proposes, after the initial intensive scrubbing, a second scrubbing stage which has a constricted portion in which a water jet is atomized through a Venturi tube at the region of the smallest cross section. Downstream therefrom a separator is provided at which the water is recovered for recycling. Alternatively, a further cleaning stage is provided whereby a portion of the cleaned exhaust air is recycled to the lacquer-spray booth.

Invariably these earlier processes utilize, therefore, as the first cleaning stage, an intensive scrubbing stage in which the shape of the scrubber determines the intimacy of contact of the scrubbing liquid with the exhaust air. In some cases, such a conventional high-intensity and high-velocity scrubber is the sole air cleaning unit, while in other cases, further air-cleaning systems are provided or required. See, for example, the above-mentioned use of the wet electrostatic filter spatially separated from the scrubbing stage and rinsed with a separate flow of water.

All of these systems have disadvantages. For example, in the high-velocity scrubbers constituting the usual first or exclusive cleaning stage, a high pressure drop or loss is unavoidable because of the need for a constriction in the scrubber to ensure intense interaction of the sprayed water and the exhaust air. In addition, or as a correlative to the high-velocity and high-pressure drop, which are associated with high energy consumption, there is a high noise level. Furthermore, where the scrubber with its constriction is provided immediately below the spray booth, the presence of a constricted flow of the exhaust air downstream of the spray booth has a detrimental effect on the manner in which the air is supplied to or passes through the spray booth.

There are also disadvantages on the water side of such apparatus. For example, relatively large amounts of water must be used to ensure thorough flushing of the large funnel-shaped constriction-forming surfaces of the scrubber portion of the apparatus to thoroughly flush the surfaces. As a consequence correspondingly large units, such as settling basins or apparatus for the active separation of the lacquer particles from the wash water, must be provided. In addition, because large volumes of water must be used, correspondingly large quantities of the chemicals which may be required to treat the wash water must be employed as well. These chemicals include surface-active, flocculating, emulsion-breaking and like agents ensuring agglomeration of the paint and lacquer particles and easier separation thereof from the wash water so that wash-water cleaning is more efficient and can be effected to a higher degree.

The utilization, for example, of chemical flocculating and settling agents can permit more economical recovery of the separated paint and lacquer as well as recovery of the water-treating agents so that waste disposal and waste water treatment costs can be minimized.

OBJECTS OF THE INVENTION

It is, therefore, the principal object of the present invention to provide an improved method of cleaning the exhaust air from a spray booth of the type described, which avoids the aforementioned disadvantages and enables the process to be carried out more efficiently and economically.

It is another object of this invention to provide an improved apparatus for cleaning the exhaust air of a paint or lacquer-spray booth.

SUMMARY OF THE INVENTION

These objects and others which will become apparent hereinafter are attained, in accordance with the invention, in a method of treating the exhaust air directly below the grate forming the bottom of the spray booth with wash water in a spraying thereof into the exhaust air and then directly feeding the sprayed air into a wet electrostatic filter. More specifically, the method of the invention comprises the steps of:

(a) passing exhaust air from the booth directly into a treatment space without prior treatment;

(b) spraying the exhaust air without prior treatment in the space with water circulated in a cleaning cycle including a water-cleaning stage; and (c) directly feeding the exhaust air upon the spraying thereof with water, into a wet electrostatic filter in the space to remove particulates from the air.

Surprisingly when the wet electrostatic filter, which has previously been thought of only as a second cleaning stage after a scrubber, forms the first stage directly following the spray booth, without the need for any constriction of the flow of the air into and through the space provided with this wet electrostatic filter, the particulate-separating and cleaning effect is improved significantly over that obtained with the aforementioned constriction scrubbers.

This effect is all the more surprising because the pressure loss in the exhaust-air stream by the use of a wet electrostatic filter is only a fraction of that which is required for effective operation of a conventional scrubber.

Greater effectiveness and reduced energy consumption of the wet electrostatic filter relative to a conventional constriction-type scrubber permits the waste water to be sprayed into the exhaust air at the wet electrostatic filter with a high pressure so that extremely fine particles are formed by the atomization of the wash water for distribution in the exhaust-air stream.

Because the wash water feed and atomization which is used with the wet electrostatic filter also allows a reduced quantity of water to be employed than is the case with a conventional constriction scrubber, for the cleaning of a given amount of exhaust air, the apparatus utilized for cleaning the water, for example the settling basin or active-cleaner unit, can be smaller. The chemicals which are required are of substantially lesser quantity.

I have found, moreover, that the paint and lacquer particles which are deposited by electrostatic precipitation in the filter can be removed from the main body of the air without requiring chemical agents in the wash water utilized to scrub the air and this, of course, provides a reduction or elimination of waste disposal costs and more effective reuse of the paint and lacquer residues which can be recovered from the apparatus for this purpose.

When the wet electrostatic filter of the invention is used, the constriction necessary for scrubbing can be eliminated and hence the noise which is generated by the air cleaning is eliminated or reduced. This means that the air cleaning can be effected in the housing forming the spray booth directly and further that the air flow through the spray booth can be made more uniform than has been the case in the past and free from the airflow problems hitherto encountered.

In short, the method of the invention eliminates all of the drawbacks developed above and provides a more effective, efficient and economical alternative to conventional air-cleaning processes of the type described.

According to a feature of the invention, about 70 to 90% of the air cleaned in the wet electrostatic filter is recirculated to the spray booth and 10 to 30% of the air cleaned is passed through an absorber. This after-cleaned air can be vented to the atmosphere.

Runoff from the electrostatic filter can be collected and sprayed into the exhaust air and the particles of paint and lacquer which are collected in the wet electrostatic filter can be carried off in 10 to 30% of the water runoff from the wet electrostatic filter.

The separation of the particles from the water can be effected in a settling basin from which the supernatant water is recycled to the spray nozzles directly below the grate of the spray booths.

The apparatus can comprise:

a housing provided with a paint-spray or lacquer-spray booth ventilated with air from top to bottom and from which a particle-entraining exhaust air emerges at the bottom;

a grate bottom directly below the booth in the housing traversed by the exhaust air from the booth;

means defining in the housing directly below the grate bottom a treatment space receiving the exhaust air without prior treatment;

means in the space for spraying the exhaust air without prior treatment with water;

a wet electrostatic filter in the space receiving the exhaust air directly upon the spraying thereof with water to remove particulates from the air; and means in the housing below the wet electrostatic filter for collecting water containing the particles of paint or lacquer and cleaned air from the wet electrostatic filter.

BRIEF DESCRIPTION OF THE DRAWING

The above and other objects, features and advantages of the present invention will become more readily apparent from the following description, reference being made to the accompanying drawing, the sole FIGURE of which is a diagram illustrating an apparatus for carrying out the process of the invention.

SPECIFIC DESCRIPTION

The paint or lacquer-spray booth 1 forms part of a housing which has a spray chamber 1a in which an automotive vehicle body 3 is seen to be positioned by way of example and below which a grate-like floor or bottom 2 is provided. The spray in the chamber 1a can be effected by hand or by automatic paint-spray nozzles and the lacquer or paint mist which is formed in the process and does not reach article 3 to be sprayed is entrained downwardly by flow of air represented by the arrows 1b through the grate 2 from the spray chamber 1a.

The housing of the spray booth directly below the floor 2 of the chamber is provided with a space 1c showing a nozzle arrangement 6 directly below the floor 2 and from which at high pressure recirculated wash water is sprayed into exhaust air in extremely fine water particles just before the exhaust air enters the wet electrostatic filter 4 in its space and likewise located below the floor 2.

The exhaust air is recirculated by a blower 8 and is withdrawn from the space 1c via passages 7 after the exhaust air passes through the openings around collecting surfaces 5 located directly below the wet electrostatic precipitator and along which the water and paint or lacquer particles are lead via a pipe 5a to a settling basin or tank 11.

From this tank, some 70 to 90% of the water is pumped (by the pump 12) from the supernatant in the basin to the atomizing nozzle arrangement 6. Fresh makeup water is supplied at 15.

A smaller proportion of the water from the basin 11, namely from 10 to 30% thereof, is pumped away from the bottom of this basin by the pump 13 together with the settled paint or lacquer particles for paint and lacquer recovery at 16.

Approximately 70 to 90% of the cleaned air is recirculated by the blower 8, while another blower 9 withdraws from 10 to 30% of the cleaned air and passes it through an adsorber 10 removing solvent residues from this air so that it can be vented into the atmosphere. Fresh air can be drawn in by the pipe 14.

I claim:

1. A method of cleaning an exhaust air from a paint-spray or lacquer-spray booth which comprises the steps of:
    (a) passing exhaust air from said booth directly into a treatment space without prior treatment;
    (b) spraying said exhaust air without prior treatment in said space with water circulated in a cleaning cycle including a water-cleaning stage; and
    (c) directly feeding the unscrubbed exhaust air upon the spraying thereof with water, into a wet electrostatic filter in said space to remove particulates from the air.

2. The method defined in claim 1, further comprising the step of recirculating about 70% to 90% of the air cleaned in the wet electrostatic filter of step (c) to said booth.

3. The method defined in claim 2, further comprising the steps of:
    after-cleaning 10% to 30% of the air cleaned in the wet electrostatic filter of step (c) in an adsorber; and
    venting the after-cleared air from said adsorber.

4. The method defined in claim 1, further comprising the steps of:
    collecting water runoff from said wet electrostatic filter; and
    spraying said exhaust air in step (b) with the collected water runoff constituting said water circulated in said cleaning cycle.

5. The method defined in claim 1, further comprising the step of:
    discharging of said particles entrained by said exhaust air from said booth and removed from said exhaust air in step (c) in about 10% to 30% of the water runoff from said wet electrostatic filter.

6. The method defined in claim 1, further comprising the steps in said cleaning cycle and in the circulation of water therein of:
    introducing water runoff from said wet electrostatic filter into a settling basin to sediment said particles therefrom; and
    withdrawing supernatant water from said basin to spray into said air in step (b).

7. The method defined in claim 1 wherein particles of said particles collected in said electrostatic filter are entrained in a stream of the water in said cleaning cycle and in the circulation of water therein, further comprising the steps of:
    separating the particles from the entraining stream of water; and
    using the water from which the particles have been separated to spray the air in step (b).

8. A spraying and air-cleaning apparatus, comprising:
    a housing provided with a paint-spray or lacquer-spray booth ventilated with air from top to bottom and from which a particle-entraining exhaust air emerges at the bottom;
    a grate bottom directly below said booth in said housing traversed by the exhaust air from said booth;
    means defining in said housing directly below said grate bottom a treatment space receiving said exhaust air without prior treatment;
    means in said space for spraying said exhaust air without prior treatment with water;
    a wet electrostatic filter in said space receiving said exhaust air directly upon the spraying thereof with water and in an unscrubbed state to remove particles from the particle-entraining exhaust air; and
    means in said housing below said wet electrostatic filter for collecting water containing said particles and cleaned air from said wet electrostatic filter.

9. The spraying apparatus defined in claim 8, further comprising means for recirculating at least part of the cleaned air collected from said wet electrostatic filter to said booth.

10. The spraying apparatus defined in claim 8, further comprising an absorber connected to said housing below said electrostatic filter and to the means in said housing for collecting said cleaned air for after cleaning a portion of said cleaned air and venting same to the atmosphere.

11. The spraying apparatus defined in claim 8, further comprising means for recirculating water collected from said electrostatic filter to the spraying of the exhaust air in said space.

12. The spraying apparatus defined in claim 11 wherein said means for recirculating water collected from said electrostatic filter includes a sedimenting basin receiving water containing said particulates from said electrostatic filter, means for extracting sedimented particulates from said basin in a stream of water, and a pump for circulating supernatant water from said basin to spray nozzles forming said means for spraying in said space below said grate but above said wet electrostatic filter.

* * * * *